(12) United States Patent
McClymont

(10) Patent No.: US 11,175,965 B2
(45) Date of Patent: Nov. 16, 2021

(54) SYSTEMS AND METHODS FOR DYNAMICALLY EVALUATING CONTAINER COMPLIANCE WITH A SET OF RULES

(71) Applicant: Verizon Patent and Licensing Inc., Basking Ridge, NJ (US)

(72) Inventor: Scott McClymont, Ringoes, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 237 days.

(21) Appl. No.: 16/596,545

(22) Filed: Oct. 8, 2019

(65) Prior Publication Data

US 2021/0103477 A1 Apr. 8, 2021

(51) Int. Cl.

| | |
|---|---|
| *G06F 9/46* | (2006.01) |
| *G06F 9/50* | (2006.01) |
| *G06F 9/455* | (2018.01) |
| *G06F 3/06* | (2006.01) |
| *H04L 29/08* | (2006.01) |
| *H04L 29/06* | (2006.01) |

(52) U.S. Cl.
CPC ............ *G06F 9/5077* (2013.01); *G06F 3/067* (2013.01); *G06F 9/45558* (2013.01); *H04L 63/20* (2013.01); *H04L 67/1097* (2013.01)

(58) Field of Classification Search
CPC .... G06F 9/5077; G06F 3/067; G06F 9/45558; H04L 63/20; H04L 67/1097
See application file for complete search history.

(56) References Cited

U.S. PATENT DOCUMENTS 7,904,909 B1 * 3/2011 Reiner ................. G06F 9/5061
718/104

OTHER PUBLICATIONS

Docker, "What is a Container? A standardized unit of software", https://www.docker.com/resources/what-container, retrieved Oct. 8, 2019, 5 pages.
Wikipedia, "Docker (software)", https://en.wikipedia.org/wiki/Docker_(software), retrieved Oct. 8, 2019, 7 pages.

* cited by examiner

*Primary Examiner* — Wissam Rashid

(57) ABSTRACT

An orchestrator platform may receive information identifying container attributes from a plurality of containers. The orchestrator platform may create aggregated information regarding the container attributes. The orchestrator platform may analyze the aggregated information to assign containers to container clusters. The orchestrator platform may analyze script information to assign scripts to script clusters. The orchestrator platform may match the script clusters and the container clusters. The orchestrator platform may generate information regarding a set of scripts for a container cluster based on the matching. The orchestrator platform may send the information regarding the set of scripts to a container to cause the container to obtain one or more scripts and execute the one or more scripts. The orchestrator platform may receive execution results. The orchestrator platform may determine whether a set of rules are satisfied. The orchestrator platform may perform one or more actions based on the determination.

20 Claims, 11 Drawing Sheets

SYSTEMS AND METHODS FOR DYNAMICALLY EVALUATING CONTAINER COMPLIANCE WITH A SET OF RULES

BACKGROUND

Containers may allow for virtualization by simulating an operating system rather than any underlying hardware. Containers may bundle code, libraries, system tools, and other dependencies into one executable package of software. In this way, containers may isolate multiple programs executing on the same hardware. Containers may operate in both cloud networks, non-cloud environments, and other virtualization environments.

BRIEF DESCRIPTION OF THE DRAWINGS

FIG. 4 is a flow chart of an example process for dynamically evaluating container compliance with a set of rules.

DETAILED DESCRIPTION OF PREFERRED EMBODIMENTS

Figure 1A:
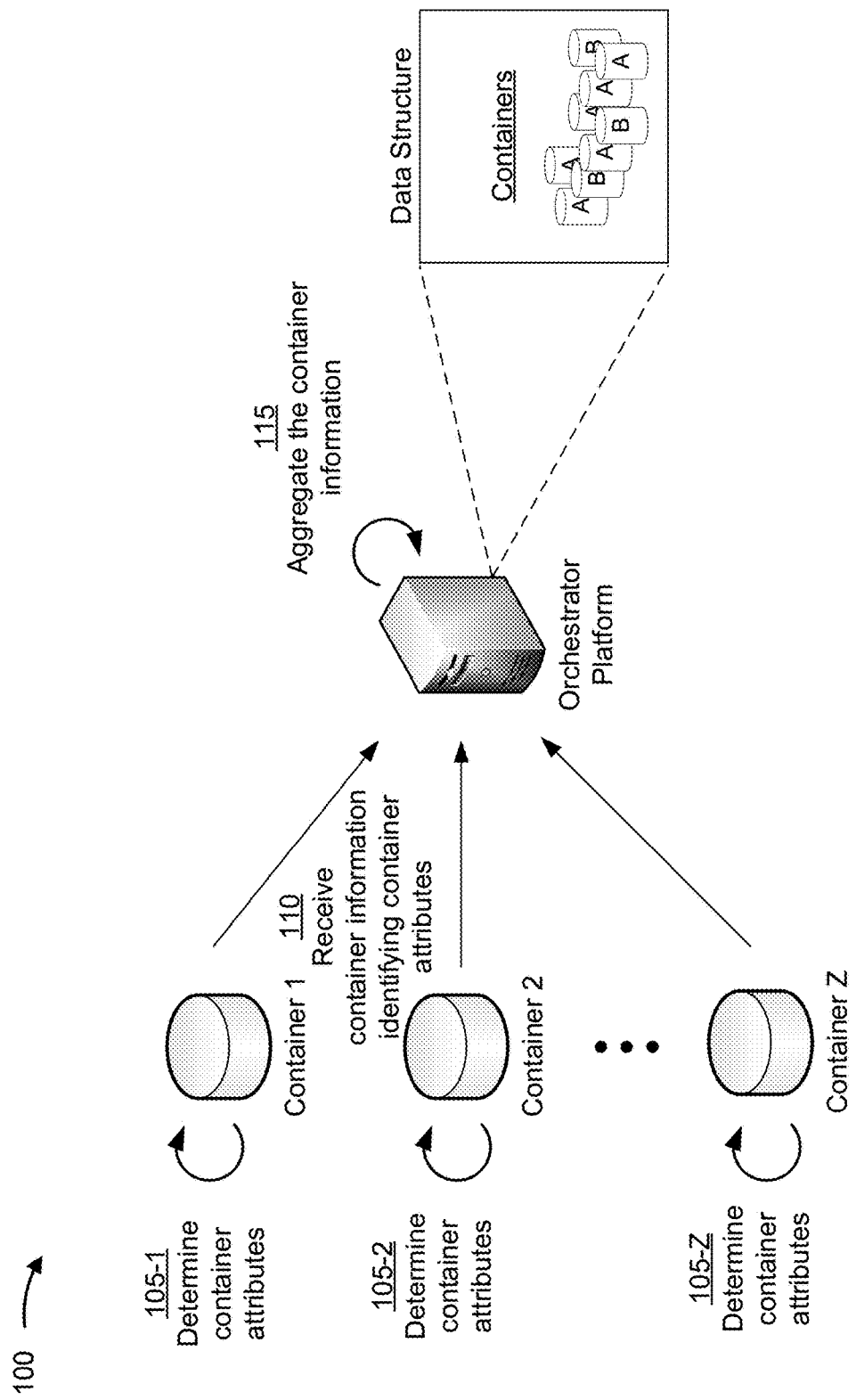
FIGS. 1A-1H are diagrams of one or more example implementations described herein.

The following detailed description of example implementations refers to the accompanying drawings. The same reference numbers in different drawings may identify the same or similar elements.

Containerization is a type of virtualization technology that may be used to isolate multiple programs executing on the same hardware. Containerization uses containers to bundle code and dependencies into an executable package. Programs executing inside of a container may not have access to all resources on a machine, but rather may have access only to contents inside the container itself. In this way, containerization provides resource isolation and allocation benefits when executing multiple containers on a machine. For example, an application that crashes on one container will not affect the same application running on other containers on the machine. Similarly, if one application is breached by malware, the negative effect will not spread to other containers on the machine. In addition, containerization limits the resources that may be used by a particular container, thereby preventing an application on the particular container from using too many resources on a machine.

Unlike other virtualization technologies, containerization involves the emulation of just an operating system, as opposed to emulating both the operating system and hardware needed to virtualize an environment. Since containers do not require booting of an operating system, creating, destroying, or replicating containers are possible in a matter of seconds. In this way, containers offer a fast, lightweight alternative to other virtualization technologies, such as virtual machine technology, which require the booting of an operating system.

However, the temporary nature of containers may make the containers difficult to detect and manage, thereby creating challenges in auditing the containers for compliance with a set of rules. These challenges are compounded by the possibility of having a great number of containers (e.g., hundreds, thousands, or more) in a system. Checking a set of containers for compliance is exacerbated because containers exist in a way that make the containers difficult to detect. In addition, the lightweight and temporary nature of containers may make containers active or inactive at inopportune times, thereby imposing more difficulty on auditing. For example, attempting to audit all containers of a particular type (e.g., all containers in the system executing a particular application, all containers in the system that use a particular version of a library, and/or the like) may be undoable, since some of the containers may not be detected, and therefore not audited. Additionally, it may be difficult to determine the contents of a container (e.g., what library, version of library, and/or the like). Attempts to address vulnerabilities on only particular types of containers involves having to identify the contents and dependencies of the containers first, such as performing actions to even determine what is executing on the containers.

Existing techniques for auditing containers may waste resources because of the need to detect containers before sending auditing scripts to the containers to ensure all containers of a certain type are being audited. In this way, existing techniques waste computing resources through executing extra processes in attempting to detect containers. The nature of containers also requires a high level of technical proficiency for auditors to access the containers. That is, auditors use advanced techniques to properly audit the containers, because the auditors determine particular aspects about a container (e.g., if the container is executing an application that needs to be audited). For example, auditors perform a series of actions on the container in order to illicit information that the container is executing a particular application. This wastes computing resources because of the additional steps used to prepare for auditing of the containers. Additionally, existing techniques may reduce the ability to audit containers in real-time, because tracking down the containers and determining that a particular container is the container that is to be audited adds extra time and resources to the auditing process. This may allow vulnerabilities and other critical issues to develop and damage the system further. In turn, this may further increase usage of computing resources and memory resources because of the additional time and resources needed to remedy developed vulnerabilities and other critical issues.

Some implementations, described herein, provide an orchestrator platform capable of dynamically evaluating a group of containers to check for security compliance. The containers in the system send information to the orchestrator platform to allow the orchestrator platform to inventory the containers. Similarly, the orchestrator platform may inventory scripts by accessing a repository of scripts and generating information on particular scripts to be sent to the containers. The orchestrator platform may send the information to the containers, causing the containers to obtain the scripts from the repository and execute the scripts. The orchestrator platform may further receive execution results from the containers and determine whether the containers are compliant with a set of rules. The orchestrator platform may perform remedial steps to cure issues in non-compliant containers. In this way, the orchestrator platform may be used to inventory both the scripts and the containers in the system, allowing auditing scripts to be sent to particular containers and provide real-time auditing against the particular containers.

Some implementations described herein may reduce the overall time to identify and diagnose vulnerabilities, because resources are not wasted in trying to detect containers. Instead, the orchestrator platform has a running inventory of the containers in the system that may be used to identify the containers that need a particular type of audit. In addition, some implementations described herein may use fewer resources compared to previous techniques, because the orchestrator platform may be integrated into a system without the need for extra processes to determine what is present on each container. Additionally, some implementations described herein may strengthen the ability for auditing techniques to adapt to dynamic environments, because the scripts do not have to be specialized for each situation. That is, special actions do not need to occur to determine whether a container needs to be audited, and instead generalized scripts that check for compliance can be used, thereby conserving computing resources that would otherwise be used with specialized scripts and actions.

FIGS. 1A-1H are diagrams of one or more example implementations 100 described herein. As shown in FIGS. 1A-1H, example implementation(s) 100 may include an orchestrator platform capable of communicating with a plurality of containers, such as hundreds, thousands, or more containers in a system, and a user device capable of providing scripts for use by the orchestrator platform.

As shown in FIG. 1A, and by reference number 105 (shown as reference numbers 105-1 through 105-Z), the plurality of containers (shown as container 1, container 2, . . . , container Z) may determine container attributes. In some implementations, a container (e.g., one of the plurality of containers, each of the plurality of containers, each of a subset of the plurality of containers, and/or the like) may determine container attributes to help identify the container and characteristics of the container to other devices. The container attributes may pertain to the status of the container, such as whether the container is in an active mode or inactive mode. A container may be in the active mode when the container is operational and the container supports a program that is functional. A container may be in the inactive mode when the container is not operational and/or the container does not support a program that is functional. Additionally, or alternatively, the container attributes may include information identifying characteristics of the container, such as what type of operating system the container is emulating, what version of operating system the container is emulating, what type of program the container is executing, a size of the container, what programming language is being used by the container, and/or the like. Additionally, or alternatively, the container attributes may include information identifying libraries or other dependencies of the container. The container attributes identified above are intended merely as examples of container attributes that might be used. In practice, different container attributes may be used in addition to, or instead of, the container attributes identified above.

The plurality of containers may determine the container attributes based on a time-based trigger, such as a trigger that specifies a particular time to determine the container attributes, a trigger that specifies a particular time interval at which to determine the container attributes, a trigger that specifies a particular frequency at which to determine the container attributes, and/or the like. Additionally, or alternatively, the plurality of containers may determine the container attributes based on a non-time-based trigger. For example, a container (e.g., one of the plurality of containers, each of the plurality of containers, each of a subset of the plurality of containers, and/or the like) may determine the container attributes immediately upon the startup of the container, upon the occurrence of an event (e.g., a time-out, a reboot, a change from the inactive mode to the active mode, and/or the like), and/or the like.

A container (e.g., one of the plurality of containers, each of the plurality of containers, each of a subset of the plurality of containers, and/or the like) may include code that causes the container to determine the container attributes. Additionally, or alternatively, the code may cause the container to send information identifying the container attributes (hereinafter "container information") to another device (e.g., the orchestrator platform) after determining the container attributes. For example, the container attributes may be present in the code itself, and the container executing the code may cause the container to locate the container information and then send the container information to another device. In another example, the code may cause the container to execute a process to determine the container attributes, and then send the container information as part of, or after, executing the process. In some implementations, there may be first code used to cause the container to determine the container attributes and second code used to cause the container to send the container information to another device. The code may include data that determines a timing of certain actions. For example, the code may cause the container to send the container information according to a time-based or a non-time-based trigger, as described above.

In some implementations, the code may be stored in a registry that is accessible by all the containers in the system. In this way, all the containers in the system may obtain the code from the registry and may then execute the code causing the containers to determine the container attributes and/or send the container information. In some implementations, the containers may send the container information to the orchestrator platform proactively (e.g., without the orchestrator platform requesting the container information). In some implementations, the containers may send the container information to the orchestrator platform reactively (e.g., in response to a request for the container information from the orchestrator platform).

As shown in FIG. 1A, and by reference number 110, the orchestrator platform may receive the container information. The orchestrator platform may be used as an authoritative point for all of the plurality of containers in the system to communicate with. In this way, the orchestrator platform may maintain a record of all of the plurality of containers in the system, because all of the plurality of the containers in the system are configured to send the container information to the orchestrator platform as a single point of contact. The orchestrator platform may store the container information, update existing container information, perform one or more other actions, and/or the like based on receiving the container information.

In some implementations, the orchestrator platform may receive the container information from all of the plurality of containers within a time period. In some implementations, the orchestrator platform may receive the container information from a first subset of the plurality of containers within a first time period and may receive the container information from a second subset of the plurality of containers within a second time period. In some implementations, the orchestrator platform may receive the container information from the plurality of containers at a plurality of different times. In this case, a timing of the sending of the container information by a first container may be independent of a timing of the sending of the container information by a second container.

As shown in FIG. 1A, and by reference number 115, the orchestrator platform may aggregate the container information in a data structure, thereby creating aggregated information. The orchestrator platform may aggregate the container information by writing the container information to the data structure. In this way, the orchestrator platform may maintain a registry of the plurality of containers in the system, thereby identifying which containers are in the system, which containers are executing in the system, what types of containers are executing in the system, and/or the like. The orchestrator platform may aggregate based on a non-time-based trigger, such as receiving new container information, receiving a certain amount of container information, receiving a certain type of container information, and/or the like. The orchestrator platform may aggregate all received container information together, received container information with previously received container information, the container information with information obtained from other sources, and/or the like.

Figure 1B:
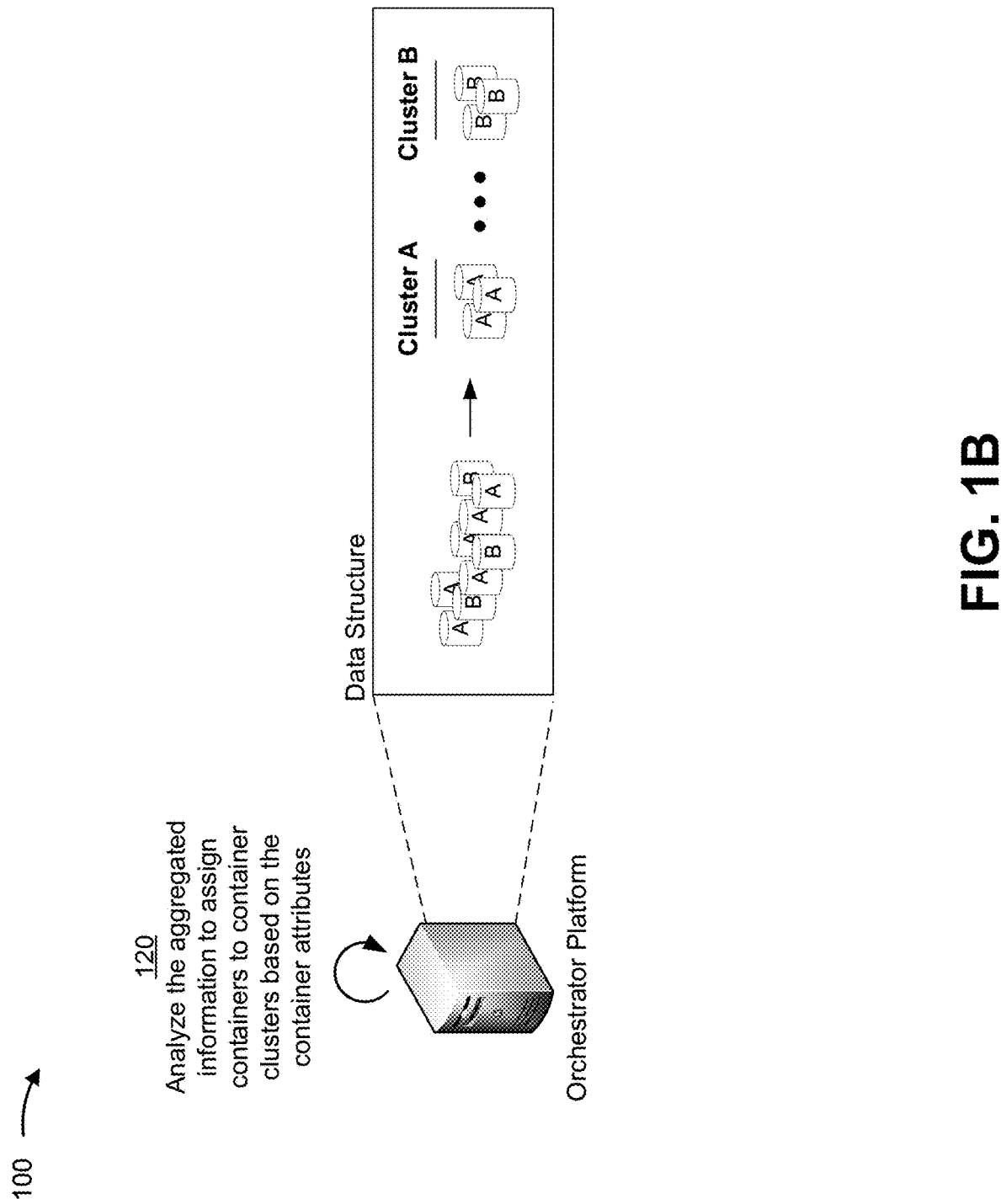

As shown in FIG. 1B, and by reference number 120, the orchestrator platform may analyze the aggregated information to assign containers, of the plurality of containers, to container clusters based on the container attributes. In this way, the orchestrator platform may organize the aggregated information to associate particular container attributes with particular container clusters. In some implementations, a particular container may belong to one or more container clusters of the container clusters. Additionally, or alternatively, a container cluster may be based on one or more container attributes. For example, a container cluster may group all containers emulating a particular operating system and a particular version of the particular operating system. In some implementations, a particular container cluster may include one or more containers.

In some implementations, the orchestrator platform may analyze the aggregated information to assign containers to container clusters based on certain triggers. For example, the orchestrator platform may analyze the aggregated information based on a time-based trigger, such as at particular time, a particular time interval, a particular frequency, and/or the like. In some implementations, the orchestrator platform may analyze the aggregated information to assign containers to container clusters based on a non-time-based trigger. For example, the orchestrator platform may analyze the aggregated information when the orchestrator platform detects a particular amount of aggregated information for which containers have not been assigned to container clusters.

In some implementations, the orchestrator platform may use one or more artificial intelligence techniques, such as machine learning, deep learning, and/or the like to assign the containers to the container clusters based on the container attributes. In some implementations, the orchestrator platform may use a machine learning model, such as a container clustering model, to assign containers to the container clusters. For example, the orchestrator platform may train the container clustering model to identify particular containers that share particular container attributes and establish a cluster (e.g., using a mapping, index, and/or the like) of the particular containers. The orchestrator platform may use a clustering algorithm (e.g., a K-means clustering algorithm, a hierarchical clustering algorithm, a density-based scan clustering with noise (DBSCAN) algorithm, a Gaussian clustering model, etc.), or a combination of different clustering algorithms to form the container clusters. The orchestrator platform may train the container clustering model using historical data associated with the container information. In another example, the orchestrator platform may train the container clustering model based on one or more parameters associated with determining relationships between the container attributes and the container clusters.

In some implementations, the orchestrator platform may perform a training operation when generating the container clustering model. For example, the orchestrator platform may portion the container attributes into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the orchestrator platform may preprocess and/or perform dimensionality reduction to reduce the container attributes to a minimum feature set. In some implementations, the orchestrator platform may train the container clustering model on this minimum feature set, thereby reducing processing to train the container clustering model, and may apply a classification technique to the minimum feature set.

Additionally, or alternatively, the orchestrator platform may train the container clustering model using a supervised training procedure that includes receiving input to the container clustering model from a subject matter expert, which may reduce an amount of time, an amount of processing resources, and/or the like, to train the container clustering model relative to an unsupervised training procedure. In some implementations, the orchestrator platform may use one or more other model training techniques, such as a neural network technique, a latent semantic indexing technique, and/or the like. For example, the orchestrator platform may perform an artificial neural network processing technique (e.g., using a two-layer feedforward neural network architecture, a three-layer feedforward neural network architecture, and/or the like) to perform pattern recognition with regard to patterns of whether particular container attributes can be used to cluster the containers. In this case, using the artificial neural network processing technique may improve an accuracy of the container clustering model generated by the orchestrator platform by being more robust to noisy, imprecise, or incomplete data, and by enabling the orchestrator platform to detect patterns and/or trends undetectable to human analysts or systems using less complex techniques.

Accordingly, the orchestrator platform may use any number of artificial intelligence techniques, machine learning techniques, deep learning techniques, and/or the like to assign the containers to the container clusters based on the container attributes. In some implementations, one or more container clustering models described herein may be trained by one or more other devices or platforms other than the orchestrator platform. In such cases, the one or more other devices and/or platforms may provide one or more trained container clustering models to the orchestrator platform to permit the orchestrator platform to use the one or more trained container clustering models, as described herein. In some implementations, the orchestrator platform (or the one or more other devices) may update the one or more trained container clustering models using feedback and/or results of using the one or more trained container clustering models.

Figure 1C:
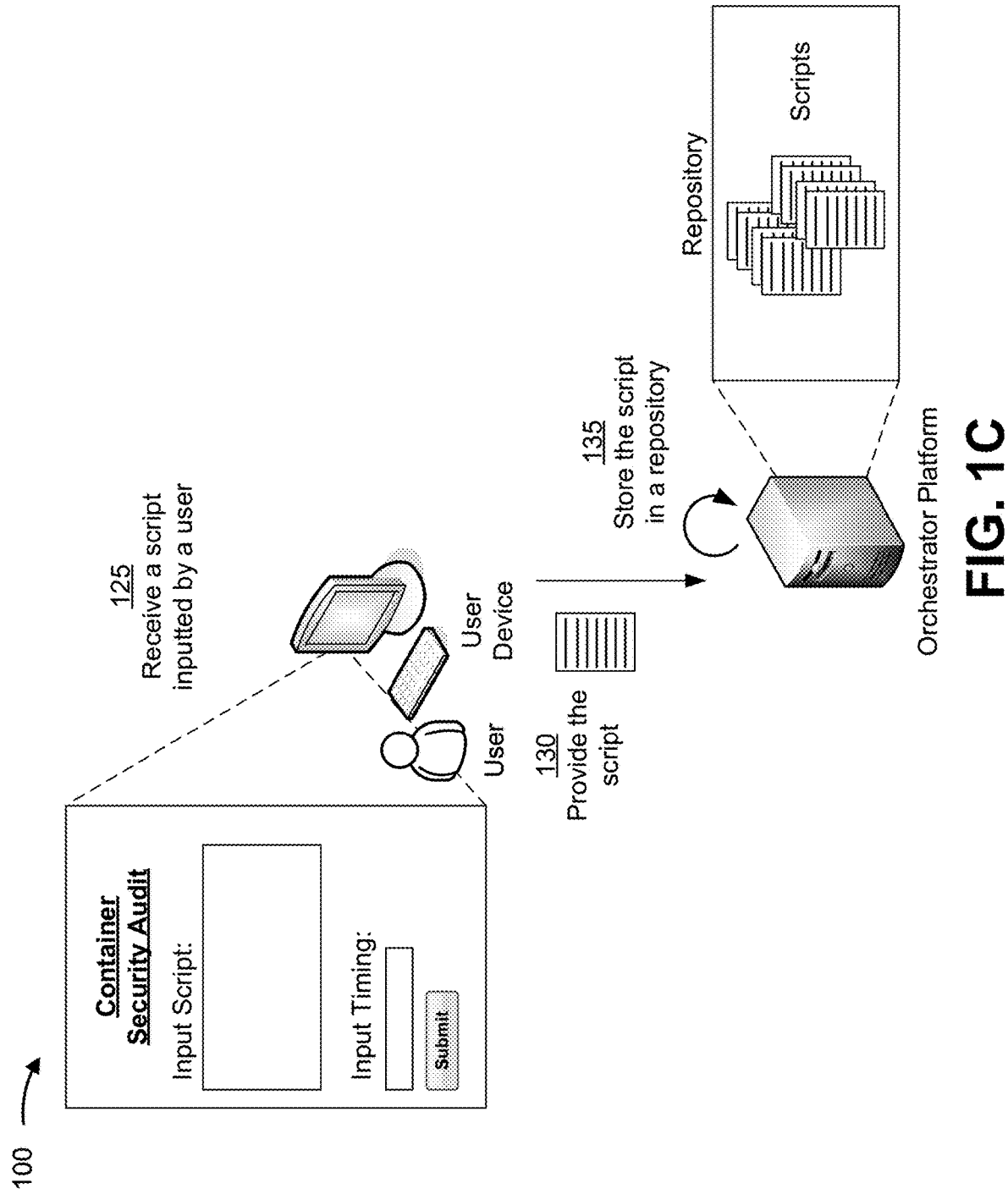

As shown in FIG. 1C, and by reference number 125, a user device may receive a script inputted by a user. The user may enter the script through a portal, version control system (e.g., GitHub), user interface, application, and/or the like. In some implementations, the user may design the script to check for compliance with a set of rules, such as one or more rules relating to security standards, on a container. For example, the user may design the script to evaluate what software version is executing on the container, evaluate what package version is executing on the container, check whether the container has access to particular system files, check how the container has access to the particular system files, evaluate whether the container can access a network, and/or the like. In some implementations, the script may indicate particular timing aspects, such as when to execute the script, how often to execute the script, a measure of priority of the script, timing of executing the script relative to another script (e.g., script A is to be executed before script B, script A is to be executed after script C, and/or the like), and/or the like. Additionally, or alternatively, the script may specify what is to be produced (e.g., an output, a characteristic of the output, a format of the output, and/or the like) when the script is executed. Additionally, or alternatively, the script may contain information indicating where the script is supposed to be executed, such as which container, what type of container, what version of a container, what container attributes a container is to have to execute the script, and/or the like.

As shown in FIG. 1C, and by reference number 130, the user device may provide the script to the orchestrator platform. In some implementations, the user device may provide the script to the orchestrator platform based on a trigger. For example, the user device may automatically provide the script to the orchestrator platform based on the user entering the script via the user device. As another example, the user device may provide the script when prompted by the orchestrator platform (e.g., the orchestrator platform may request the script from the user device). As another example, the user device may provide the script based on a time-based trigger, such as at a particular time, at a particular time interval, within a particular window of time, and/or the like. As another example, the user device may provide the script based on a non-time-based trigger, such as once a particular quantity of scripts have been entered via the user device and/or the like. As another example, the user device may provide the script using a combination of triggers, such as at a particular time of day after being prompted by the orchestrator platform.

As shown in FIG. 1C, and by reference number 135, the orchestrator platform may store the script in a repository. The repository may be integrated into the system and be accessible by one or more components of the system, such as accessible by the plurality of containers and the orchestrator platform. In this way, a container, of the plurality of containers in the system, may obtain a particular script from the repository.

The repository may contain other scripts received from the user device, previously stored scripts from other sources (e.g., one or more other user devices, one or more server devices, and/or the like), and/or the like. In some implementations, the repository may store script attributes associated with the scripts. The script attributes may include metadata (e.g., where the script came from, when the script was stored, size of the script, and/or the like). Additionally, or alternatively, the script attributes may include information from the script relating to what the user designed the script to do, such as evaluating which software version is executing on the container, evaluating which package versions are executing on the container, checking whether the container has access to particular system files, checking how the container has access to particular system files, evaluating whether the container can access a network, evaluating how the container can access the network, and/or the like). Additionally, or alternatively, the script attributes may include information related to a timing trigger (e.g., when to execute the script, how often to execute the script, a measure of priority of the script, and/or the like). Additionally, or alternatively, the script attributes may include information related to timing aspects of executing the script relative to another script (e.g., information instructing that script A is to be executed before script B, information instructing that script A is to be executed after script C, and/or the like). Additionally, or alternatively, the script attributes may include information related to the output of the script when the script is executed (e.g., a particular output, a characteristic of the output, a format of the output, and/or the like). Additionally, or alternatively, the script attributes may include information related to a particular container (e.g., which container the script is configured to be executed on, what type of container the script is configured to be executed on, what version of the container the script is configured to be executed on, what container attributes a container is to have to execute the script, and/or the like). The script attributes, identified above, are intended merely as examples of script attributes that may be associated with a script. In practice, a script may include one or more script attributes, such as a single script attribute identified above, a plurality of script attributes identified above, and/or one or more script attributes not identified above.

In some implementations, the orchestrator platform may organize scripts in the repository to facilitate script retrieval by the other sources. For example, the repository may use a table with two or more dimensions to organize the scripts, assign identifiers to the scripts, classify the scripts, tag the scripts with the script attributes, and/or the like. In some implementations, the repository may use another storage structure (e.g., other than a table) to store and organize the scripts.

Figure 1D:
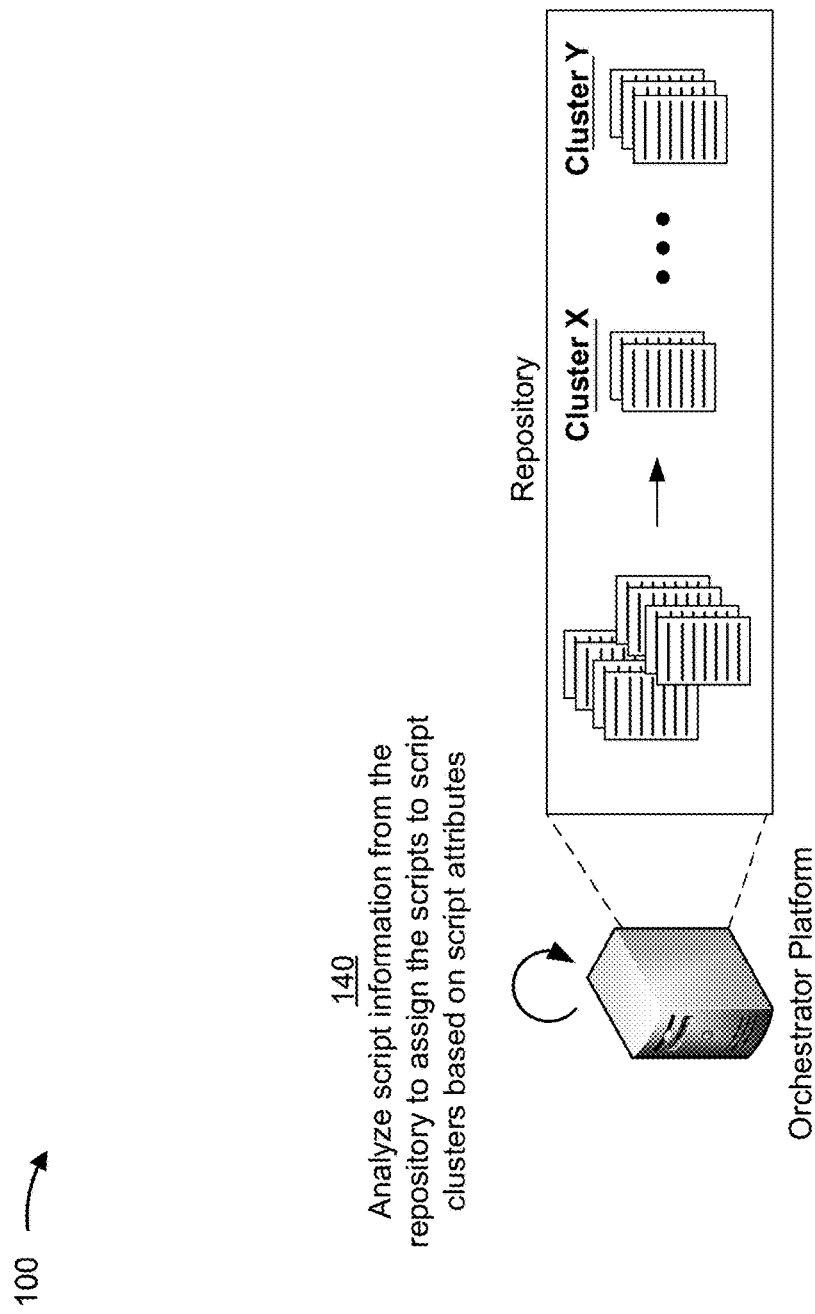

As shown in FIG. 1D, and by reference number 140, the orchestrator platform may analyze script information from the repository to assign the scripts to script clusters based on the script attributes. The script information may include information identifying the scripts in the repository and the script attributes of the scripts in the repository. In this way, the orchestrator platform may organize the script information to associate particular script attributes with particular script clusters. In some implementations, a particular script may belong to one or more script clusters of the script clusters. Additionally, or alternatively, a script cluster may be based on one or more script attributes. For example, a script cluster may group all scripts designed to execute on a particular container and designed to check if a particular container version is executing on the particular container. In some implementations, a particular script cluster may include one or more scripts.

In some implementations, the orchestrator platform may analyze the script information to assign scripts to script clusters based on certain triggers. For example, the orchestrator platform may analyze the script information based on a time-based trigger, such as at a particular time, a particular time interval, a particular frequency, and/or the like. In some implementations, the orchestrator platform may analyze the script information to assign scripts to script clusters based on a non-time-based trigger. For example, the orchestrator platform may analyze the script information when the orchestrator platform detects a particular amount of script information for which scripts have not been assigned to script clusters.

In some implementations, the orchestrator platform may use one or more artificial intelligence techniques, such as machine learning, deep learning, and/or the like to assign the scripts to the script clusters based on the script attributes. In some implementations, the orchestrator platform may use a machine learning model, such as a script clustering model, to assign scripts to the script clusters. For example, the orchestrator platform may train the script clustering model to identify particular scripts that share particular script attributes and establish a cluster (e.g., using a mapping, index, and/or the like) of the particular scripts. The orchestrator platform may use a clustering algorithm (e.g., a K-means clustering algorithm, a hierarchical clustering algorithm, a density-based scan clustering with noise (DB-SCAN) algorithm, a Gaussian clustering model, etc.) or a combination of the clustering algorithms to form the script clusters. The orchestrator platform may train the script clustering model using historical data associated with the script information. In another example, the orchestrator platform may train the script clustering model based on one or more parameters associated with determining relationships between the script attributes and the script clusters.

In some implementations, the orchestrator platform may perform a training operation when generating the script clustering model. For example, the orchestrator platform may portion the script attributes into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the orchestrator platform may preprocess and/or perform dimensionality reduction to reduce the script attributes to a minimum feature set. In some implementations, the orchestrator platform may train the script clustering model on this minimum feature set, thereby reducing processing to train the script clustering model, and may apply a classification technique to the minimum feature set.

Additionally, or alternatively, the orchestrator platform may train the script clustering model using a supervised training procedure that includes receiving input to the script clustering model from a subject matter expert, which may reduce an amount of time, an amount of processing resources, and/or the like, to train the script clustering model relative to an unsupervised training procedure. In some implementations, the orchestrator platform may use one or more other model training techniques, such as a neural network technique, a latent semantic indexing technique, and/or the like. For example, the orchestrator platform may perform an artificial neural network processing technique (e.g., using a two-layer feedforward neural network architecture, a three-layer feedforward neural network architecture, and/or the like) to perform pattern recognition with regard to patterns of whether particular script attributes can be used to cluster the scripts. In this case, using the artificial neural network processing technique may improve an accuracy of the script clustering model generated by the orchestrator platform by being more robust to noisy, imprecise, or incomplete data, and by enabling the orchestrator platform to detect patterns and/or trends undetectable to human analysts or systems using less complex techniques.

Accordingly, the orchestrator platform may use any number of artificial intelligence techniques, machine learning techniques, deep learning techniques, and/or the like to assign the scripts to the script clusters based on the script attributes. In some implementations, one or more script clustering models described herein may be trained by one or more other devices or platforms other than the orchestrator platform. In such cases, the one or more other devices and/or platforms may provide one or more trained script clustering models to the orchestrator platform to permit the orchestrator platform to use the one or more trained script clustering models, as described herein. In some implementations, the orchestrator platform (or the one or more other devices) may update the one or more trained script clustering models using feedback and/or results of using the one or more trained script clustering models.

In some implementations, the orchestrator platform may use information regarding the container clusters to assign the scripts to the script clusters. For example, the orchestrator platform may determine script clusters to which to assign the scripts based on the container attributes associated with the container clusters to which the containers have been assigned. In other words, the container attributes may be used to influence how the script clusters are formed before the scripts are assigned to these script clusters. As one simple example, assume that a particular container cluster has a container attribute that indicates that containers assigned to that particular container cluster execute a Windows 10 operating system. In this example, a particular script cluster may be formed for scripts that perform various checks on containers executing the Windows 10 operating system. Thus, scripts that share this script attribute may be assigned to this particular script cluster.

In some implementations, as described above, the orchestrator platform may assign the scripts to the script clusters after the orchestrator platform assigns the containers to the container clusters. In some implementations, the orchestrator platform may assign the scripts to the script clusters while (e.g., concurrently with) the orchestrator platform assigns the containers to the container clusters. In some implementations, the orchestrator platform may assign the scripts to the script clusters before the orchestrator platform assigns the containers to the container clusters.

In some implementations, such as when the orchestrator platform assigns the scripts to the script clusters before the orchestrator platform assigns the containers to the container clusters, the orchestrator platform may use information regarding the script clusters to assign the containers to the container clusters. For example, the orchestrator platform may determine container clusters to which to assign the containers based on the script attributes associated with the script clusters to which the scripts have been assigned. In other words, the script attributes may be used to influence how the container clusters are formed before the containers are assigned to these container clusters. As one simple example, assume that a particular script cluster has a script attribute relating to performing various checks on containers executing the Windows 10 operating system. In this example, a particular container cluster may be formed for containers that execute the Windows 10 operating system. Thus, containers that share this container attribute may be assigned to this particular container cluster.

Figure 1E:
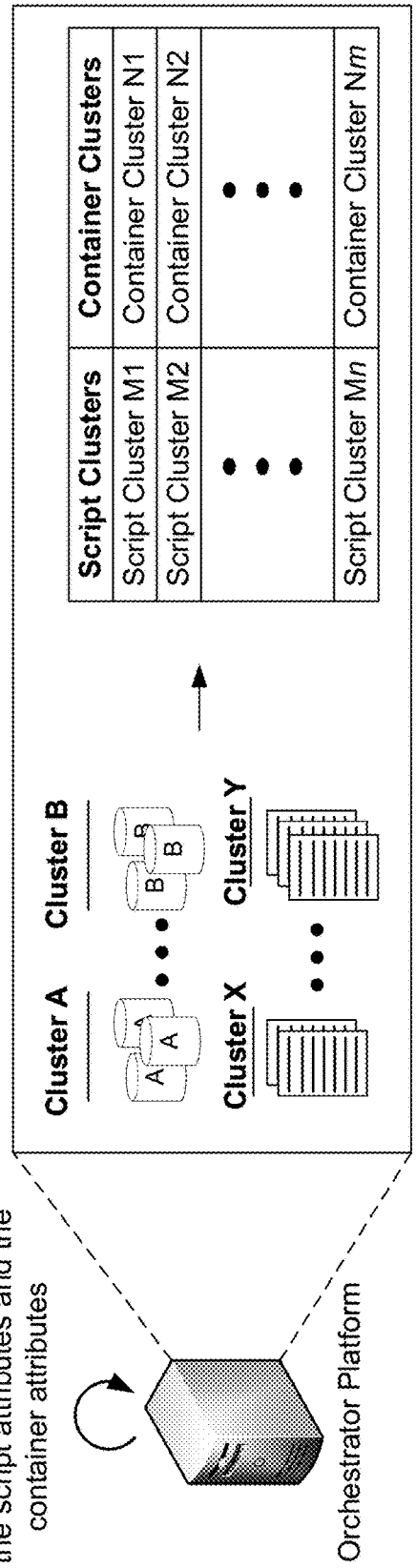

As shown in FIG. 1E, and by reference number 145, the orchestrator platform may match the script clusters and the container clusters based on the script attributes and the container attributes. In some implementations, the orchestrator platform may match the script clusters and the container clusters based on similarities between the script attributes and the container attributes. For example, the orchestrator platform may match the script clusters and the container clusters based on the script attributes and the container attributes both referencing a particular type of container. As another example, the orchestrator platform may match the script clusters and the container clusters based on similar timing triggers associated with the script attributes and the container attributes. A script cluster may be matched to one or more container clusters. Additionally, or alternatively, a container cluster may be matched to one or more script clusters.

In some implementations, the orchestrator platform may match the script clusters and the container clusters using a matching algorithm, a searching algorithm, a pattern recognition algorithm, and/or the like. For example, the orchestrator platform may use a brute-force pair-matching algorithm to compare the container attributes and the script attributes using a compatibility or distance function. In some implementations, the orchestrator platform may use a combination of different algorithms to match the script clusters and the container clusters.

In some implementations, the orchestrator platform may assign the containers to the container clusters without assigning the scripts to the script clusters. In this case, the orchestrator platform may match individual scripts (rather than script clusters) to the container clusters. In some implementations, the orchestrator platform may assign the scripts to the script clusters without assigning the containers to the container clusters. In this case, the orchestrator platform may match script clusters to individual containers (rather than container clusters). In some implementations, the orchestrator platform may not assign the containers to the container clusters and may not assign the scripts to the script clusters. In this case, the orchestrator platform may match individual scripts (rather than script clusters) to individual containers (rather than container clusters).

Figure 1F:
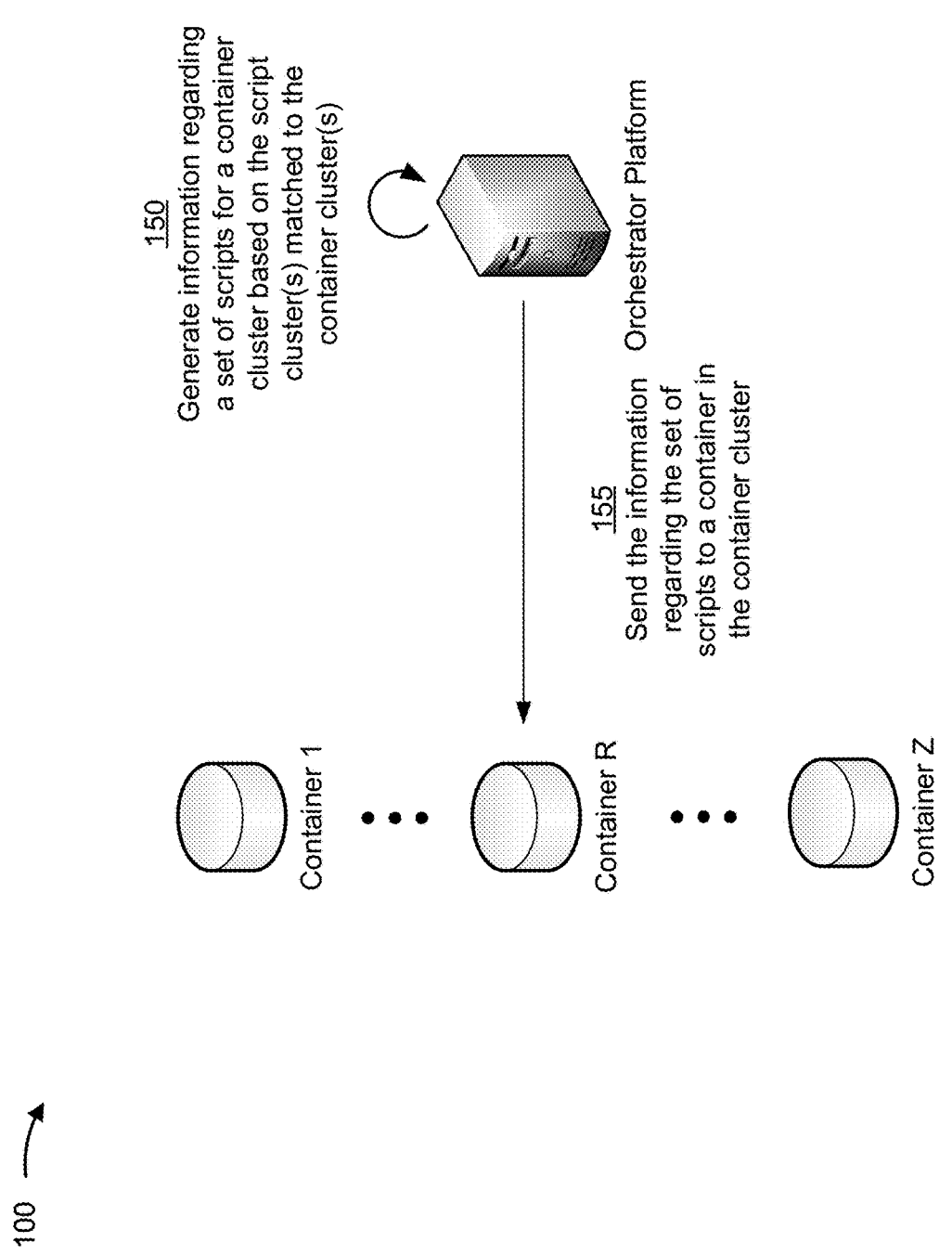

As shown in FIG. 1F, and by reference number 150, the orchestrator platform may generate information regarding a set of scripts for a container cluster based on the script cluster(s) matched to the container cluster(s). The information regarding the set of scripts may include information identifying a location to obtain the set of scripts, instructions directing a container to obtain the set of scripts, and/or the like. For example, the information regarding the set of scripts may include an address for a respective location of each script of the set of scripts. In another example, the information regarding the set of scripts may include script identifiers providing the location of the set of scripts in the repository.

The set of scripts may include scripts from one or more script clusters that were matched to the container cluster. In this way, the orchestrator platform may generate information for containers, in the container cluster, to process regarding the set of scripts. For example, the information may cause the containers, in the container cluster, to obtain the set of scripts from the repository.

In some implementations, the orchestrator platform may include an instruction to obtain fewer than the full set of scripts from the repository. For example, the orchestrator platform may instruct a container in the container cluster to check if the container has already stored a script, of the set of scripts, and to not obtain a script that the container has already stored. In some implementations, the orchestrator platform (rather than the container) may make the determination of whether the container has already stored a script of the set of scripts. For example, the orchestrator platform may keep track of scripts for which information has already been provided to the container. In this case, the orchestrator platform may generate information regarding a set of scripts for which information has not already been provided to the container.

In some implementations, the orchestrator platform may include, in the information regarding the set of scripts, an instruction regarding a time-based trigger, such as a trigger that specifies a particular time to obtain the set of scripts, a trigger that specifies a particular time interval at which to obtain the set of scripts, a trigger that specifies a particular frequency at which to obtain the set of scripts, and/or the like. For example, the orchestrator platform may include an instruction directing the container to obtain the set of scripts at particular times, time intervals, and/or the like. Additionally, or alternatively, the orchestrator platform may include an instruction directing the container to execute the set of scripts at particular times, time intervals, and/or the like.

In some implementations, the orchestrator platform may include, in the information regarding the set of scripts, an instruction regarding a non-time-based trigger. For example, the orchestrator platform may include an instruction directing the container to obtain the set of scripts upon the startup of the container, upon the occurrence of an event (e.g., after a time-out, a reboot, a change from the inactive mode to the active mode, and/or the like), and/or the like. Additionally, or alternatively, the orchestrator platform may include an instruction directing the container to execute the set of scripts upon the startup of the container, upon the occurrence of an event, and/or the like.

As shown in FIG. 1F, and by reference number 155, the orchestrator platform may send the information regarding the set of scripts to a container in the container cluster, and the container may receive the information regarding the set of scripts. The information regarding the set of scripts may include information that the container may use to obtain the set of scripts, execute the set of scripts, and/or the like. For example, the information regarding the set of scripts may include a list of scripts (e.g., a list of script identifiers) and/or other information associated with scripts in the list of scripts to assist the container with obtaining and/or executing the set of scripts. In some implementations, the orchestrator platform may send the information regarding the set of scripts systemwide (e.g., send the information regarding the set of scripts to all the containers in the system, multiple containers in the container cluster, multiple containers in multiple container clusters, and/or the like).

In some implementations, the orchestrator platform may send the information regarding the set of scripts to the container based on a time-based trigger, such as a trigger that specifies a particular time to send the information regarding the set of scripts, a trigger that specifies a particular time interval at which to send the information regarding the set of scripts, a trigger that specifies a particular frequency at which to send the information regarding the set of scripts, and/or the like.

In some implementations, the orchestrator platform may send the information regarding the set of scripts to the container based on a non-time-based trigger. For example, the orchestrator platform may send the information upon the startup of the container, upon the occurrence of an event (e.g., after a time-out of the container, a reboot of the container, a change from the inactive mode to the active mode of the container, and/or the like), and/or the like.

Figure 1G:
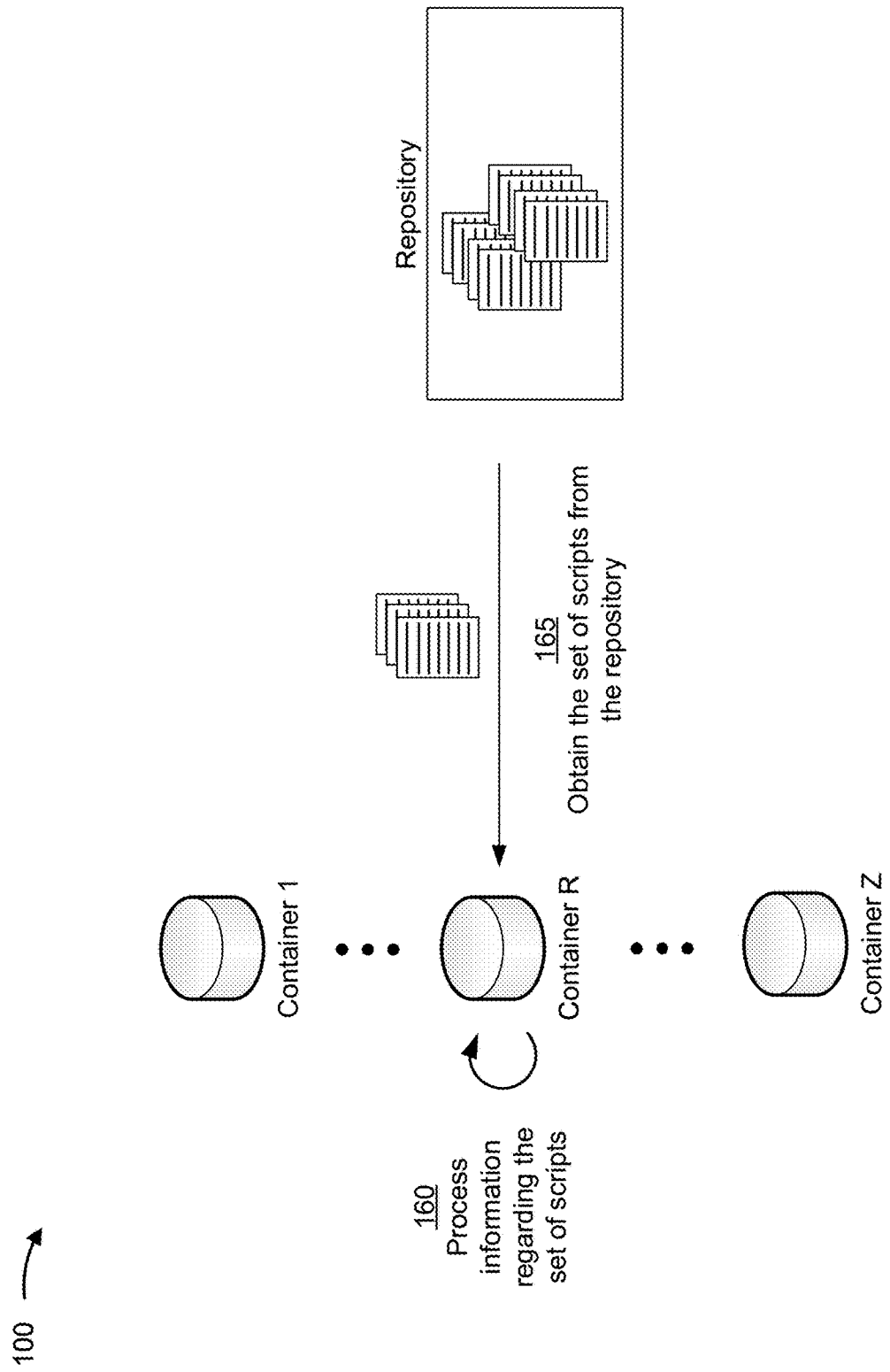

As shown in FIG. 1G, and by reference number 160, the container may process the information regarding the set of scripts. For example, the container may parse the information regarding the set of scripts to identify scripts that are included in the information regarding the set of scripts. In some implementations, the container may determine whether the container already stores any of the scripts included in the information regarding the set of scripts. For example, the container may compare first script identifiers, corresponding to the scripts included in the information regarding the set of scripts, with second script identifiers of scripts that the container has stored in memory. When a first script identifier matches a second script identifier, this means that the container already has the corresponding script stored in memory.

In some implementations, the container may batch process the scripts included in the information regarding the set of scripts. For example, the container may determine whether the container already stores two or more of the scripts in parallel, which may conserve computing resources over processing the scripts serially. In some implementations, the container may serially process the scripts included in the information regarding the set of scripts. For example, the container may determine whether the container already stores a first one of the scripts, then determine whether the container already stores a second one of the scripts, then determine whether the container already stores a third one of the scripts, and so on. In some implementations, an order in which the container serially processes the scripts may be based on information included in the information regarding the set of scripts. For example, the information regarding the set of scripts may identify measures of priority of scripts in the set of scripts and the container may serially determine whether the container already stores one or more of the scripts based on the measures of priority of the scripts.

As shown in FIG. 1G, and by reference number 165, the container may obtain the set of scripts from the repository. The container may use the information regarding the set of scripts to locate the scripts. For example, the container may use an address for a location of the set of scripts to locate and obtain the set of scripts. In another example, the container may use the information regarding the set of scripts to send a query to the repository with script identifiers to obtain the scripts. In some implementations, the container may obtain fewer than the full set of scripts from the repository based on a determination by the container. For example, as detailed above, the container may have determined that one or more scripts, of the set of scripts, are already stored by the container. Accordingly, the container may obtain only non-stored scripts (e.g., scripts that are not already stored by the container), of the set of scripts, from the repository.

In some implementations, the container may obtain scripts, of the set of scripts, in batch from the repository. In some implementations, the container may obtain the scripts, of the set of scripts, in a particular order, or sequence. For example, the container may obtain a first script, of the set of scripts, from the repository and then obtain a second script, of the set of scripts, at a later time. Additionally, or alternatively, the container may obtain the second script dependent on an output of the first script. For example, the container may obtain the first script from the repository, execute the first script, and selectively obtain the second script from the repository based on whether the first script was successfully executed, based on an output of executing the first script, and/or the like. In another example, the container may obtain the first script from the repository, and then stop obtaining any additional scripts, of the set of scripts, from the repository based on whether the first script was successfully executed, based on an output of executing the first script, and/or the like.

In some implementations, the container may obtain additional information, such as script attributes, regarding the set of scripts from the repository. The container may obtain script attributes for a script, of the set of scripts, such as metadata (e.g., where the script came from, when the script was stored, size of the script, and/or the like), information regarding what the user designed the script to do (e.g., evaluate software versions, evaluate package versions, check for access to system files, and/or the like), timing triggers, and/or the like. For example, the container may obtain information that execution of a first script, of the set of scripts, depends on execution of a second script of the set of scripts. Further, the information regarding this dependency may cause the container to perform an action regarding the dependency, such as obtaining the second script from the repository if the second script is not already stored by the container.

Figure 1H:
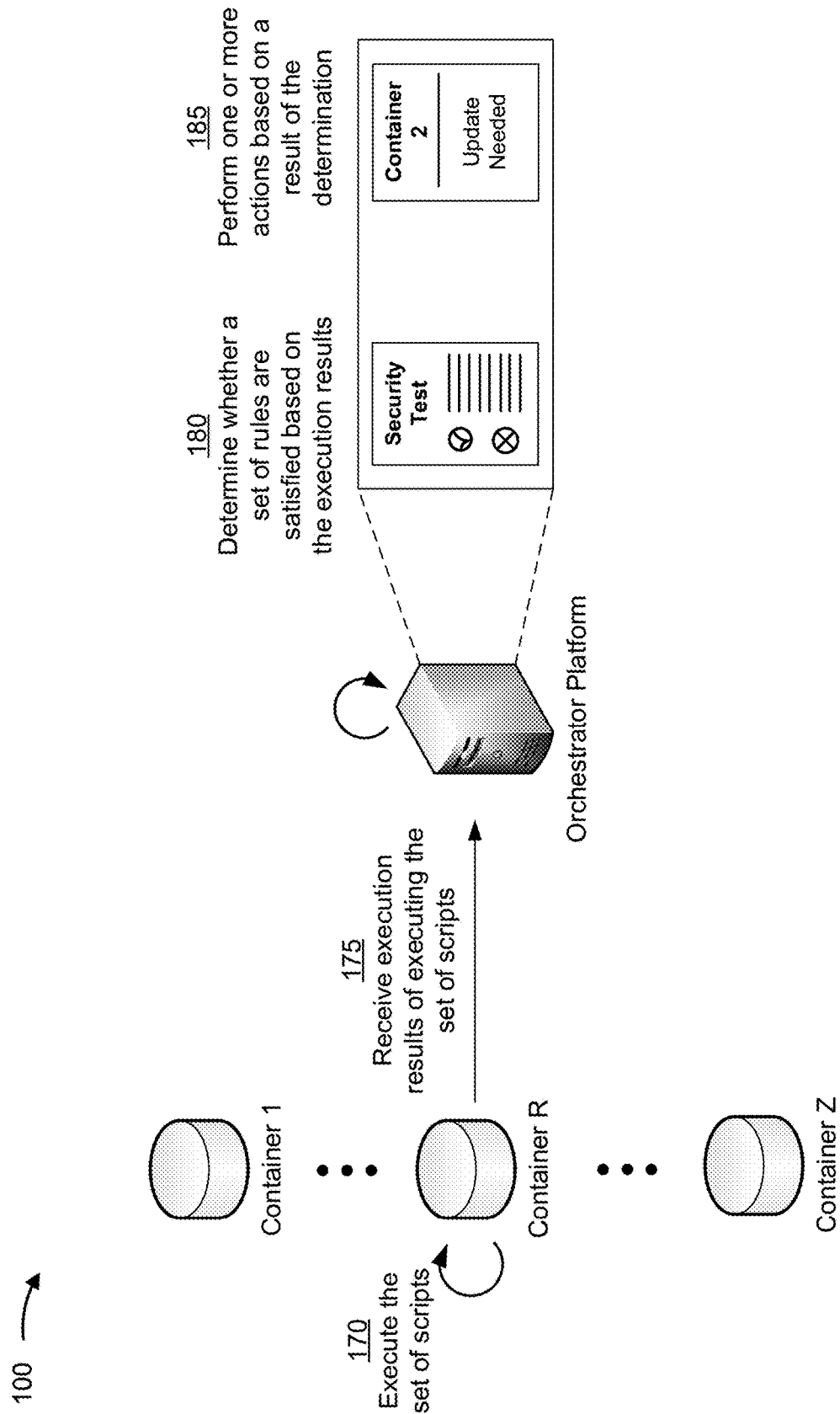

As shown in FIG. 1H, and by reference number 170, the container may execute the set of scripts. The container may generate execution results or other output based on executing the set of scripts.

The container may execute the set of scripts based on instructions provided by the orchestrator platform, the repository, and/or the set of scripts themselves. The instructions may impose a number of conditions for executing the set of scripts, similar to the script attributes described above. For example, the container may execute the set of scripts according to a timing trigger, such as executing the set of scripts at a particular time, at a particular time interval, and/or the like. In some implementations, the container may execute scripts, of the set of scripts, based on dependencies, conditions, and/or the like. For example, the container may execute a second script, of the set of scripts, based on executing a first script. In another example, the container may execute the second script conditionally based on the first script (e.g., executing the second script only if the first script does not execute successfully, executing the second script only if the first script does execute successfully, executing the second script based on how long it takes to execute the first script, and/or the like). Additionally, or alternatively, the container may execute a particular script, of the set of scripts, based on a determination of the container. For example, the container may determine that the container has already executed a similar script to script A, and therefore not execute script A or stop execution of script A.

The container may execute the scripts, of the set of scripts, in a particular order based on the script attributes. For example, the container may categorize the scripts based on the functions of the scripts, and then execute the scripts by category, such as executing all scripts that check for access to a network first before executing other scripts with a different function. In another example, the container may execute scripts based on metadata, such as using dates/times that the scripts were stored into the repository, ordering the scripts in reverse chronological order, and then executing the scripts in order.

In some implementations, the container may generate a respective execution result for each script, of the set of scripts, that was executed. Additionally, or alternatively, the container may generate execution results of the full set of scripts. The execution results may be output in a specific format to be stored by the container and/or in a different format to be sent to another container, device (e.g., the orchestrator platform), and/or the like. The execution results may include identifying information, such as information identifying the container that generated the execution results, information identifying a particular script the produced the execution results, and/or the like. In this way, the execution results may be traced back to a particular container if sent elsewhere. Additionally, or alternatively, the execution results may include data assigning a priority, a date/time, and/or the like to the execution results. In this way, another device (e.g., the orchestrator platform) that receives the execution results may be able to categorize or prioritize the execution results.

As shown in FIG. 1H, and by reference number 175, the orchestrator platform may receive the execution results from the container. The orchestrator platform may receive the execution results from the container in batch (e.g., the container sends all of the execution results after executing all of the set of scripts), or at different times (e.g., the container sends the execution results based on a particular timing, the container sends a particular execution result upon executing a particular script, and/or the like). In some implementations, the orchestrator platform may receive execution results from multiple containers, receive execution results systemwide (e.g., from all containers in the system), and/or the like. The orchestrator platform may receive identification information, such as information identifying the container, the type of container, and/or the like associated with the execution results. Additionally, or alternatively, the orchestrator platform may receive identification information, such as information identifying the script, the type of script, and/or the like that produced the execution results.

As shown in FIG. 1H, and by reference number 180, the orchestrator platform may determine whether a set of rules are satisfied based on the execution results. In this way, the orchestrator platform may determine whether a container is compliant, has met a testing standard, and/or the like. In some implementations, the orchestrator platform may determine whether the set of rules are satisfied based on the execution results of a particular script for a particular container. For example, the orchestrator platform may receive execution results indicating that a network is accessible via the container and, based on this, determine that the container is noncompliant. In another example, the orchestrator platform may determine whether a set of rules are satisfied based on the execution results of a full set of scripts for a container. For example, the orchestrator platform may determine that the container is compliant only after receiving execution results for the full set of scripts, and determining the set of rules are satisfied for the execution results for the full set of scripts.

As shown in FIG. 1H, and by reference number 185, the orchestrator platform may perform one or more actions based on a result of determining whether the set of rules were satisfied based on the execution results. In this way, the orchestrator platform may perform remedial steps to improve the security of those containers that have been found noncompliant. For example, the orchestrator platform may issue a notification to the user device and/or another device (e.g., a server device) to indicate which containers, of the plurality of containers, have been found noncompliant. Additionally, or alternatively, the orchestrator platform may prioritize the execution results to send notifications to the user device and/or another device. In this way, particular execution results may receive more immediate remedial action than other execution results, therefore potentially allowing more serious compliance issues to be resolved more quickly. The orchestrator platform may prioritize the execution results in different ways, such as by container, by container cluster, by script, by script cluster, and/or the like. For example, the orchestrator platform may prioritize the execution results of containers executing the oldest version of an operating system.

In some implementations, the orchestrator platform may send a notification to the container to cause the container to execute an update file to mitigate an issue, such as a compliance issue. Additionally, or alternatively, the orchestrator platform may identify, generate, and send code to the container to resolve an issue. In some implementations, the orchestrator platform may send a notification to all containers of a particular type based on determining the noncompliance of one container of that particular type. In this way, the orchestrator platform may conduct remedial steps for containers in the system even if the orchestrator platform has not yet received execution results from those containers.

In this way, the orchestrator platform may create an inventory of containers and scripts, allowing the scripts to be sent to containers to provide real-time auditing against the containers. This allows the dynamic evaluation of a system of containers for compliance with a set of rules, thereby allowing better protection by identifying and diagnosing vulnerabilities more quickly. The centralized management of scripts and containers reduces overall time in identifying and diagnosing vulnerabilities and saves computing resources in trying to detect containers. Additionally, this strengthens the ability for auditing techniques to adapt to dynamic environments.

As indicated above, FIGS. 1A-1H are provided merely as examples. Other examples can differ from what is described with regard to FIGS. 1A-1H. The number and arrangement of devices and networks shown in FIGS. 1A-1H are provided as an example. In practice, there may be additional devices and/or networks, fewer devices and/or networks, different devices, and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of implementation(s) 100 may perform one or more functions described as being performed by another set of devices of implementation(s) 100.

Figure 2:
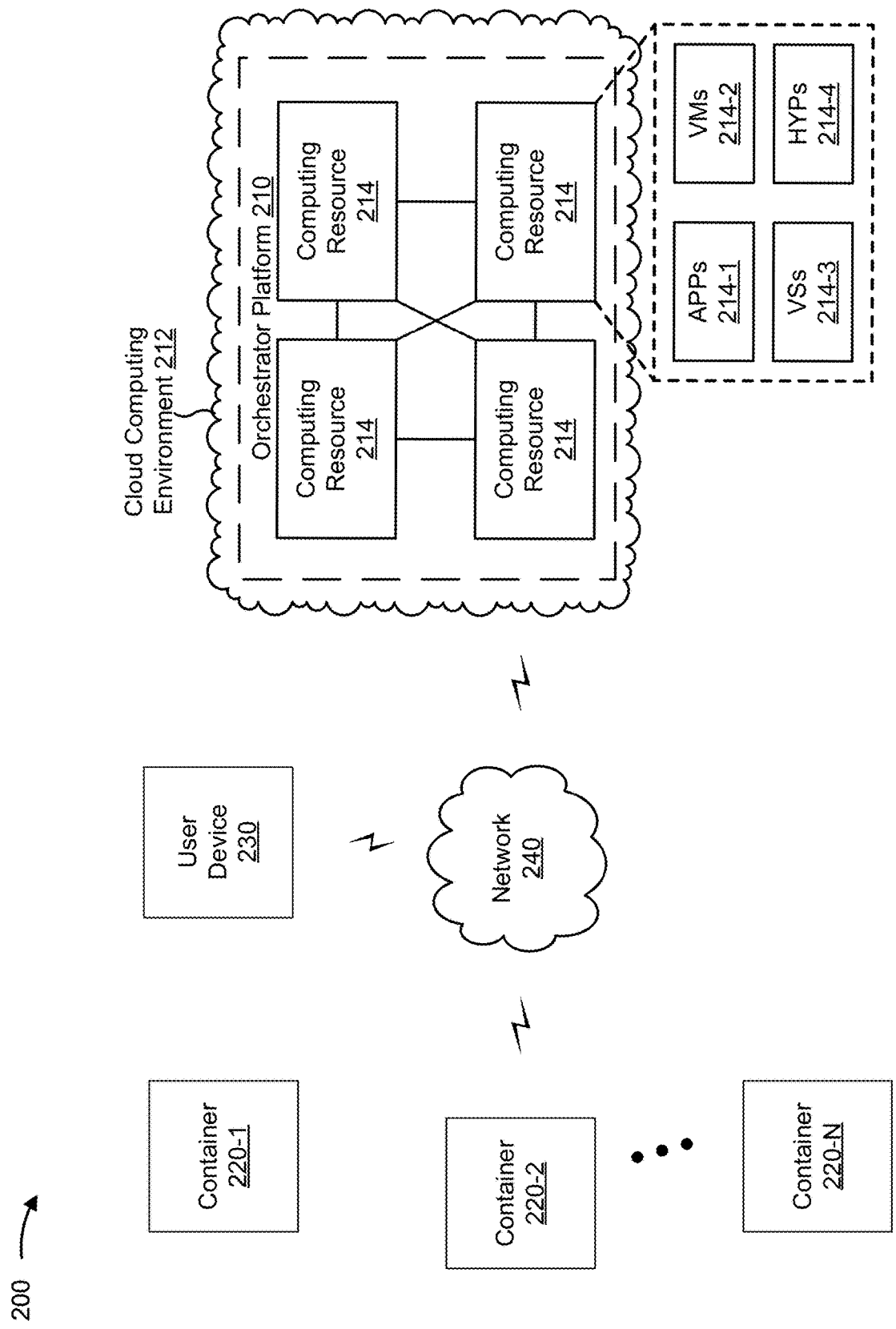
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include orchestrator platform 210, containers 220 (shown as containers 220-1 to 220-N, and referred to individually as container 220 and collectively as containers 220), a user device 230, and a network 240. Devices of environment 200 may interconnect via wired connections, wireless connections, or a combination of wired and wireless connections.

Orchestrator platform 210 includes one or more devices capable of receiving, generating, storing, processing, and/or providing information associated with a container, For example, orchestrator platform 210 may include a server (e.g., in a data center or a cloud computing environment), a proxy server, a data center (e.g., a multi-server micro data center), a workstation computer, a virtual machine (VM) provided in a cloud computing environment, a user device, or a similar type of device. In some implementations, orchestrator platform 210 may send or receive information related to containers.

In some implementations, as shown, orchestrator platform 210 may be hosted in cloud computing environment 212. Notably, while implementations described herein describe orchestrator platform 210 as being hosted in cloud computing environment 212, in some implementations, orchestrator platform 210 may not be cloud-based (i.e., may be implemented outside of a cloud computing environment) or may be partially cloud-based.

Cloud computing environment 212 includes an environment that hosts orchestrator platform 210. Cloud computing environment 212 may provide computation, software, data access, storage, etc. services that do not require end-user (e.g., user device 230) knowledge of a physical location and configuration of system(s) and/or device(s) that hosts orchestrator platform 210. As shown, cloud computing environment 212 may include a group of computing resources 214 (referred to collectively as "computing resources 214" and individually as "computing resource 214").

Computing resource 214 includes one or more personal computers, workstation computers, server devices, or other types of computation and/or communication devices. In some implementations, computing resource 214 may host orchestrator platform 210. The cloud resources may include compute instances executing in computing resource 214, storage devices provided in computing resource 214, data transfer devices provided by computing resource 214, etc. In some implementations, computing resource 214 may communicate with other computing resources 214 via wired connections, wireless connections, or a combination of wired and wireless connections.

As further shown in FIG. 2, computing resource 214 includes a group of cloud resources, such as one or more applications ("APPs") 214-1, one or more virtual machines ("VMs") 214-2, virtualized storage ("VSs") 214-3, one or more hypervisors ("HYPs") 214-4, or the like.

Application 214-1 includes one or more software applications that may be provided to or accessed by user device 230. Application 214-1 may eliminate a need to install and execute the software applications on user device 230. For example, application 214-1 may include software associated with orchestrator platform 210 and/or any other software capable of being provided via cloud computing environment 212. In some implementations, one application 214-1 may send/receive information to/from one or more other applications 214-1, via virtual machine 214-2.

Virtual machine 214-2 includes a software implementation of a machine (e.g., a computer) that executes programs like a physical machine. Virtual machine 214-2 may be either a system virtual machine or a process virtual machine, depending upon use and degree of correspondence to any real machine by virtual machine 214-2. A system virtual machine may provide a complete system platform that supports execution of a complete operating system ("OS"). A process virtual machine may execute a single program, and may support a single process. In some implementations, virtual machine 214-2 may execute on behalf of a user (e.g., user device 230), and may manage infrastructure of cloud computing environment 212, such as data management, synchronization, or long-duration data transfers.

Virtualized storage 214-3 includes one or more storage systems and/or one or more devices that use virtualization techniques within the storage systems or devices of computing resource 214. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 214-4 may provide hardware virtualization techniques that allow multiple operating systems (e.g., "guest operating systems") to execute concurrently on a host computer, such as computing resource 214. Hypervisor 214-4 may present a virtual operating platform to the guest operating systems, and may manage the execution of the guest operating systems. Multiple instances of a variety of operating systems may share virtualized hardware resources.

Container 220 includes a software implementation of a machine (e.g., a computer) that executes programs like a physical machine. For example, container 220 may be either a system container or a process container, depending upon use and degree of correspondence to any real machine. A system container may provide a complete system platform that supports execution of a complete operating system. A process container may execute a single program and may support a single process. In some implementations, container 220 may execute on behalf of a user (e.g., user device 230), and may manage infrastructure of a cloud computing environment, such as data management, synchronization, or long-duration data transfers.

User device 230 includes one or more devices capable of receiving, generating, storing, processing, and/or providing information associated with providing scripts for a container and/or receiving notifications of execution results. For example, user device 230 may include a communication and/or computing device, such as a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, user device 230 may provide a script for a container to orchestrator platform 210, as described elsewhere herein. Additionally, or alternatively, user device 230 can receive an output of the script executed on the container, as described elsewhere herein.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
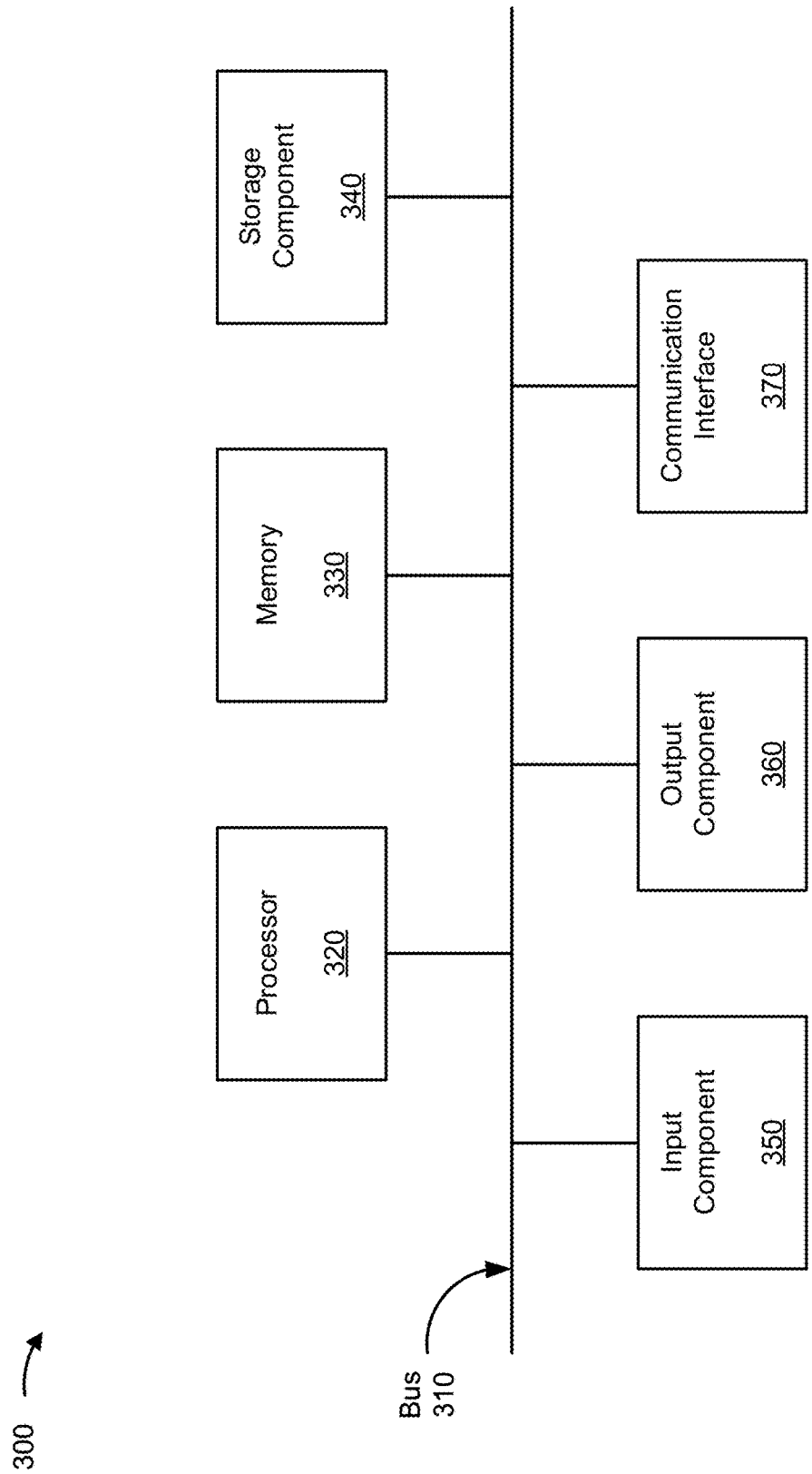
FIG. 3 is a diagram of example components of one or more devices of FIG. 2.

FIG. 3 is a diagram of example components of a device 300. Device 300 may correspond to orchestrator platform 210, container 220, and/or user device 230. In some implementations, orchestrator platform 210, container 220, and/or user device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamically evaluating container compliance with a set of rules. In some implementations, one or more process blocks of FIG. 4 may be performed by a device (e.g., orchestrator platform 210). In some implementations, one or more process blocks of FIG. 4 may be performed by another device or a group of devices separate from or including the device, such as a container (e.g., container 220), a user device (e.g., user device 230), and/or the like.

As shown in FIG. 4, process 400 may include receiving, from a plurality of containers, information identifying container attributes of the plurality of containers (block 405). For example, the device (e.g., using computing resource 214, processor 320, memory 330, storage component 340, input component 350, output component 360, communication interface 370, and/or the like) may receive, from a plurality of containers, information identifying container attributes of the plurality of containers, as described above. In some implementations, the container attributes may indicate information identifying a type of a container, of the plurality of containers, or information identifying whether a container, of the plurality of containers, is active.

As further shown in FIG. 4, process 400 may include aggregating the information identifying the container attributes to create aggregated information (block 410). For example, the device (e.g., using computing resource 214, processor 320, memory 330, storage component 340, input component 350, output component 360, communication interface 370, and/or the like) may aggregate the information identifying the container attributes to create aggregated information, as described above. In some implementations, aggregating the information identifying the container attributes may comprise of aggregating the information at a specified time or periodicity.

As further shown in FIG. 4, process 400 may include analyzing the aggregated information to assign containers to container clusters based on the container attributes (block 415). For example, the device (e.g., using computing resource 214, processor 320, memory 330, storage component 340, input component 350, output component 360, communication interface 370, and/or the like) may analyze the aggregated information to assign containers to container clusters based on the container attributes, as described above. In some implementations, analyzing the aggregated information to assign the containers to the container clusters may comprise of identifying similarities between the container attributes and assigning the containers to the container clusters based on the similarities between the container attributes. In some implementations, analyzing the aggregated information to assign the containers to the container clusters may comprise of assigning each of the containers to a respective one or more of the container clusters.

As further shown in FIG. 4, process 400 may include analyzing script information from a repository to assign scripts to script clusters based on script attributes (block 420). For example, the device (e.g., using computing resource 214, processor 320, memory 330, storage component 340, input component 350, output component 360, communication interface 370, and/or the like) may analyze script information from a repository to assign scripts to script clusters based on script attributes, as described above. In some implementations, the scripts may include information to evaluate a software version, evaluate a package version, check for permission in accessing a file, check for network access, or check for network access via a particular route. In some implementations, analyzing the script information from the repository to assign the scripts to the script clusters may include assigning the scripts to the script clusters based on priority levels of the scripts. In some implementations, analyzing the script information from the repository to assign the scripts to the script clusters may include assigning the scripts based on time information of the scripts, where the time information for a particular script indicates one a recommended time to execute the particular script and/or a recommended periodicity to execute the particular script.

As further shown in FIG. 4, process 400 may include matching the script clusters and the container clusters based on the script attributes and the container attributes (block 425). For example, the device (e.g., using computing resource 214, processor 320, memory 330, storage component 340, input component 350, output component 360, communication interface 370, and/or the like) may match the script clusters and the container clusters based on the script attributes and the container attributes, as described above.

As further shown in FIG. 4, process 400 may include generating information regarding a set of scripts for a container cluster, of the container clusters, based on matching one or more of the script clusters and the container cluster, wherein the set of scripts includes scripts from the one or more of the script clusters that were matched with the container cluster (block 430). For example, the device (e.g., using computing resource 214, processor 320, memory 330, storage component 340, input component 350, output component 360, communication interface 370, and/or the like) may generate information regarding a set of scripts for a container cluster, of the container clusters, based on matching one or more of the script clusters and the container cluster, as described above. In some implementations, the set of scripts includes scripts from the one or more of the script clusters that were matched with the container cluster. In some implementations, generating the information regarding the set of scripts may comprise of determining that the container already possesses a first subset of scripts of the set of scripts and not a second subset of scripts of the set of scripts, and generating the information regarding the set of scripts to identify the second subset of scripts and not the first subset of scripts.

As further shown in FIG. 4, process 400 may include sending the information regarding the set of scripts to a container in the container cluster to cause the container to obtain one or more scripts, of the set of scripts, from the repository and execute the one or more scripts (block 435). For example, the device (e.g., using computing resource 214, processor 320, memory 330, storage component 340, input component 350, output component 360, communication interface 370, and/or the like) may send the information regarding the set of scripts to a container in the container cluster to cause the container to obtain one or more scripts, of the set of scripts, from the repository and execute the one or more scripts, as described above. In some implementations, the process 400, when sending the information regarding the set of scripts to the container, includes instructing the container to check whether the container already possesses the one or more scripts before obtaining the one or more scripts from the repository. In some implementations, alone or in combination with the first implementation, sending the information regarding the set of scripts to the container may include sending the information regarding the set of scripts to the container at a specified time or periodicity. In some implementations, sending the information regarding the set of scripts to the container may include sending the information to one or more other containers of the plurality of containers. In some implementations, the one or more other containers are different from the container. In some implementations, sending the information regarding the scripts to the container may include sending additional information or instructions. In some implementations, sending the information regarding the set of scripts to the container may include notifying the container of priority levels of the set of scripts to cause the container to execute the set of scripts according to the priority levels. In some implementations, sending the information regarding the set of scripts to the container may include sending the information regarding the set of scripts with the time information.

As further shown in FIG. 4, process 400 may include receiving execution results, of executing the one or more scripts, from the container (block 440). For example, the device (e.g., using computing resource 214, processor 320, memory 330, storage component 340, input component 350, output component 360, communication interface 370, and/or the like) may receive execution results, of executing the one or more scripts, from the container, as described above.

As further shown in FIG. 4, process 400 may include determining whether a set of rules are satisfied based on the execution results (block 445). For example, the device (e.g., using computing resource 214, processor 320, memory 330, storage component 340, input component 350, output component 360, communication interface 370, and/or the like) may determine whether a set of rules are satisfied based on the execution results, as described above. In some implementations, determining whether the set of rules are satisfied may include determining whether the set of rules are satisfied based on sorting the execution results, where the execution results are to be sorted based on one or more of whether the execution results resulted from executing a certain type of script, or respective types of the execution results.

As further shown in FIG. 4, process 400 may include performing one or more actions based on a result of the determination (block 450). For example, the device (e.g., using computing resource 214, processor 320, memory 330, storage component 340, input component 350, output component 360, communication interface 370, and/or the like) may perform one or more actions based on a result of the determination, as described above. In some implementations, performing the one or more actions may include notifying the container to execute a script. In some implementations, performing one or more actions may include identifying additional scripts to be executed by the container and sending information regarding the additional scripts to the container to cause the container to obtain the additional scripts from the repository and execute the additional scripts. In some implementations, process 400, when performing the one or more actions, may include assigning priority levels to the execution results, sorting the execution results based on the priority levels, and performing at least one of the one or more actions based on the priority levels of the execution results. In some implementations, process 400 further comprises aggregating the execution results with other execution results from one or more other containers to form aggregated execution results, where at least one of the one or more actions being performed are based on the aggregated execution results. In some implementations, where the execution results were sorted based on one or more of whether the execution results resulted from executing a certain type of script, or respective types of the execution results, performing the one or more actions may include performing the one or more actions based on determining whether the set of rules are satisfied based on sorting the execution results.

In some implementations, process 400 may further comprise identifying a type or quantity of scripts executing on the plurality of containers and determining additional container attributes based on the type or quantity of scripts executing on the plurality of containers.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  receiving, by a device and from a plurality of containers, information identifying container attributes of the plurality of containers;
  aggregating, by the device, the information identifying the container attributes to create aggregated information;
  analyzing, by the device, the aggregated information to assign containers to container clusters based on the container attributes;
  analyzing, by the device, script information from a repository to assign scripts to script clusters based on script attributes;
  matching, by the device, the script clusters and the container clusters based on the script attributes and the container attributes;
  generating, by the device, information regarding a set of scripts for a container cluster, of the container clusters, based on matching one or more of the script clusters and the container cluster, wherein the set of scripts includes scripts from the one or more of the script clusters that were matched with the container cluster;
  sending, by the device, the information regarding the set of scripts to a container in the container cluster to cause the container to obtain one or more scripts, of the set of scripts, from the repository and execute the one or more scripts;
  receiving, by the device, execution results, of executing the one or more scripts, from the container;
  determining, by the device, whether a set of rules are satisfied based on the execution results; and
  performing, by the device, one or more actions based on a result of the determination.

2. The method of claim 1, wherein the container attributes indicate one or more of:
  information identifying a type of a container, of the plurality of containers, or
  information identifying whether a container, of the plurality of containers, is active.

3. The method of claim 1, wherein aggregating the information identifying the container attributes comprises:
  aggregating the information at a specified time or periodicity.

4. The method of claim 1, wherein analyzing the aggregated information to assign the containers to the container clusters comprises:
   identifying similarities between the container attributes, and
   assigning the containers to the container clusters based on the similarities between the container attributes.

5. The method of claim 1, wherein analyzing the aggregated information to assign the containers to the container clusters comprises:
   assigning each of the containers to a respective one or more of the container clusters.

6. The method of claim 1, wherein the scripts include information to perform one or more of:
   evaluating a software version,
   evaluating a package version,
   checking for a permission,
   checking for network access, or
   checking for network access via a particular route.

7. The method of claim 1, wherein generating the information regarding the set of scripts comprises:
   determining that the container already possesses a first subset of scripts of the set of scripts and not a second subset of scripts of the set of scripts, and
   generating the information regarding the set of scripts to identify the second subset of scripts and not the first subset of scripts,
   wherein the second subset of scripts includes the one or more scripts.

8. A device, comprising:
   one or more memories; and
   one or more processors, communicatively coupled to the one or more memories, configured to:
      receive, from a plurality of containers, information identifying container attributes of the plurality of containers;
      aggregate the information identifying the container attributes to create aggregated information;
      analyze the aggregated information to assign containers to container clusters based on the container attributes;
      match scripts and the container clusters based on the container attributes;
      generate information regarding a set of scripts, of the scripts, for a container cluster, of the container clusters, based on matching the scripts and the container clusters;
      send the information regarding the set of scripts to a container in the container cluster to cause the container to obtain one or more scripts, of the set of scripts, from a repository and execute the one or more scripts;
      receive execution results, of executing the one or more scripts, from the container;
      determine whether a set of rules are satisfied based on the execution results; and
      perform one or more actions based on a result of the determination.

9. The device of claim 8, wherein the one or more processors, when sending the information regarding the set of scripts to the container, are to:
   instruct the container to check whether the container already possesses the one or more scripts before obtaining the one or more scripts from the repository.

10. The device of claim 8, wherein the one or more processors, when sending the information regarding the set of scripts to the container, are to:
    send the information regarding the set of scripts to the container at one or more of:
       a specified time, or
       a specified periodicity.

11. The device of claim 8, wherein the one or more processors are further to:
    aggregate the execution results with other execution results from one or more other containers to form aggregated execution results,
    wherein at least one of the one or more actions is to be performed based on the aggregated execution results.

12. The device of claim 8, wherein the one or more processors, when determining whether the set of rules are satisfied, are to:
    determine whether the set of rules are satisfied based on sorting the execution results,
       wherein the execution results are to be sorted based on one or more of:
          whether the execution results resulted from executing a certain type of script, or
          respective types of the execution results, and
    wherein the one or more processors, when performing the one or more actions, are to:
       perform the one or more actions based on determining whether the set of rules are satisfied based on sorting the execution results.

13. The device of claim 8, wherein the one or more processors, when performing the one or more actions, are to:
    notify the container to execute a script.

14. The device of claim 8, wherein the one or more processors, when performing one or more actions, are to:
    identify additional scripts to be executed by the container, and
    send information regarding the additional scripts to the container to cause the container to obtain the additional scripts from the repository and execute the additional scripts.

15. A non-transitory computer-readable medium storing instructions, the instructions comprising:
    one or more instructions that, when executed by one or more processors, cause the one or more processors to:
       receive, from a plurality of containers, information identifying container attributes of the plurality of containers;
       aggregate the information identifying the container attributes to create aggregated information;
       analyze script information from a repository to assign scripts to script clusters based on script attributes;
       match the script clusters and the plurality of containers based on the script attributes and the container attributes;
       generate information regarding a set of scripts for a container, of the plurality of containers, based on matching one or more of the script clusters and the container, wherein the set of scripts includes a group of scripts from the one or more of the script clusters that were matched with the container;
       send the information regarding the set of scripts to the container to cause the container to obtain one or more scripts, of the set of scripts, from the repository and execute the one or more scripts;
       receive execution results, of executing the one or more scripts, from the container;
       determine whether a set of rules are satisfied based on the execution results; and
       perform one or more actions based on a result of the determination.

16. The non-transitory computer-readable medium of claim 15, wherein the one or more instructions, that cause the one or more processors to perform the one or more actions, cause the one or more processors to:
  assign priority levels to the execution results,
  sort the execution results based on the priority levels, and
  perform at least one of the one or more actions based on the priority levels of the execution results.

17. The non-transitory computer-readable medium of claim 15, wherein the one or more instructions, when executed by the one or more processors, further cause the one or more processors to:
  identify a type or quantity of scripts executing on the plurality of containers, and
  determine additional container attributes based on the type or quantity of scripts executing on the plurality of containers.

18. The non-transitory computer-readable medium of claim 15, wherein the one or more instructions, that cause the one or more processors to analyze the script information from the repository to assign the scripts to the script clusters, cause the one or more processors to:
  assign the scripts to the script clusters based on priority levels of the scripts, and
  wherein the one or more instructions, that cause the one or more processors to send the information regarding the set of scripts to the container, cause the one or more processors to:
  notify the container of the priority levels of the set of scripts to cause the container to execute the set of scripts according to the priority levels.

19. The non-transitory computer-readable medium of claim 15, wherein the one or more instructions, that cause the one or more processors to analyze the script information from the repository to assign the scripts to the script clusters, cause the one or more processors to:
  assign the scripts based on time information of the scripts,
    wherein the time information, for a particular script, indicates one or more of:
      a recommended time to execute the particular script, or
      a recommended periodicity to execute the particular script, and
  wherein the one or more instructions, that cause the one or more processors to send the information regarding the set of scripts to the container, cause the one or more processors to:
  send the information regarding the set of scripts with the time information.

20. The non-transitory computer-readable medium of claim 15, wherein the one or more instructions, that cause the one or more processors to send the information regarding the set of scripts to the container, cause the one or more processors to:
  send the information to one or more other containers of the plurality of containers,
  wherein the one or more other containers are different from the container.

\* \* \* \* \*